William R. King
INVENTOR.

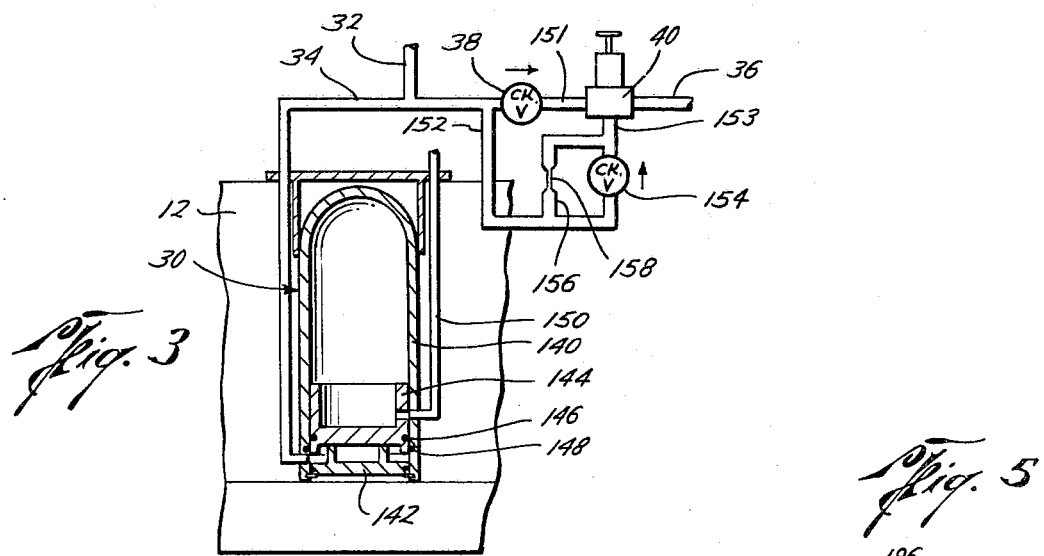
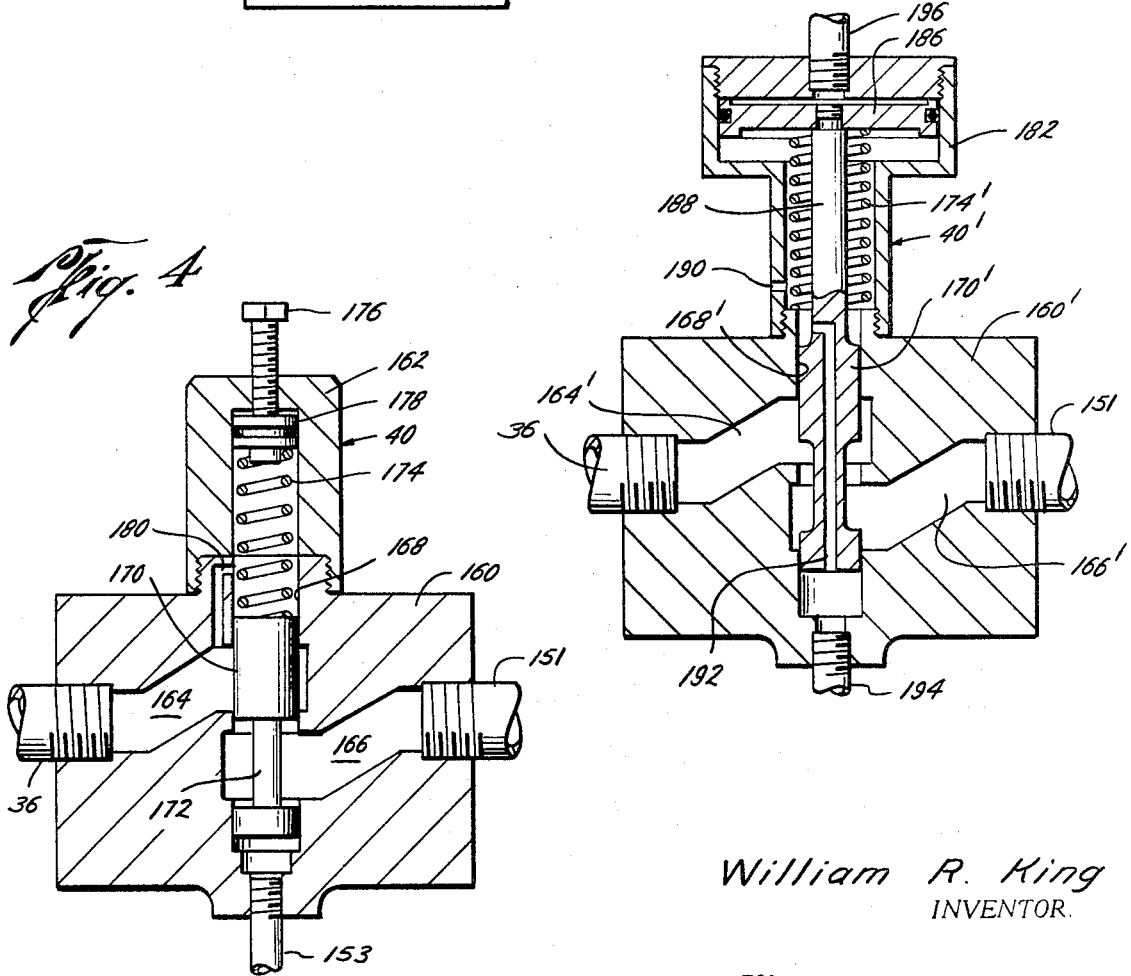

William R. King
INVENTOR.

BY

ATTORNEY

June 13, 1972 W. R. KING 3,669,572
CONSTANT FLOW PUMPING SYSTEM
Filed June 8, 1970 5 Sheets-Sheet 5

William R. King
INVENTOR.

BY
ATTORNEY

United States Patent Office 3,669,572
Patented June 13, 1972

3,669,572
CONSTANT FLOW PUMPING SYSTEM
William R. King, 1909 Sunshine Square,
Longview, Tex. 75601
Filed June 8, 1970, Ser. No. 44,383
Int. Cl. F03b; F04b 9/08, 17/00, 35/00
U.S. Cl. 417—390
17 Claims

ABSTRACT OF THE DISCLOSURE

A system for providing liquid at high pressure at a substantially constant flow rate including a fluid powered pump operated by power fluid supplied at a lower pressure, the power fluid also being supplied in a desired proportion to an accumulator which discharges to the fluid powered pump at the beginning of each stroke of the pump.

BACKGROUND OF THE INVENTION (1) Field of the invention

This invention relates to a constant flow pumping system, including a combination of a hydraulic accumulator and a fluid powered pump, and to a proportioning device for proportioning the flow of fluid between the accumulator and the pump.

(2) Description of the prior art

In certain chemical processes, such as high pressure ethylene polymerization processes, it is necessary to feed liquids into an extremely high pressure container in which the process is taking place. Such a container may, for example, be under a pressure of 30,000 p.s.i. or more. High pressure pumping systems have heretofore been devised for pumping such liquids into such a high pressure container.

Heretofore such high pressure pumping systems have consisted of a fluid powered reciprocating pump which has a large power fluid piston on the same rod as two small pumping pistons, so as to make a two cylinder pump, one cylinder taking suction while the other pumps. The powdered piston is supplied with liquid from a comparatively low pressure source which provides the liquid at a constant flow rate to alternate sides of the power piston. The pressure liquid may, for example, by supplied by a Vickers constant delivery pump, which is a multiple cylinder reciprocating pump, or by a conventional swash plate pump. In one application, the ratio between the areas of the power piston and the pumping pistons is such that if the pumping piston must deliver liquid at 30,000 p.s.i., a power fluid pressure of 600 p.s.i. is required.

When the high pressure liquid is being pumped against a back pressure of, for example, 30,000 p.s.i. the liquid is actually compressed a substantial amount, and in addition equipment and pipes carrying the liquid are expanded. Thus at the beginning of each pumping stroke it is necessary to compress the liquid and expand the equipment and pipes containing it enough to reach a pressure of 30,000 p.s.i. before any liquid can actually be pumped into the high pressure container. The pistons must therefore move a sufficient distance to compress the liquid and re-expand the equipment and pipes before any flow can begin. As a matter of actual practice in the 30,000 p.s.i. system hereinbefore referred to it has been found that the pistons may move from 10 to 12 percent of the total stroke before pressure is built up high enough to start flow again. Thus the operation of such a system may produce an interrupted flow where the high pressure fluid is flowing perhaps 90 percent of the time and is not flowing 10 percent of the time.

It is known in the prior art to use pressure accumulators in hydraulic systems to smooth out pressure surges in the system and to supply additional hydraulic fluid for high demand periods in a cycle. Such systems are shown, for example, in U.S. Pats. 2,881,739 to Huppert, 3,175,354 to Firth et al. 3,192,717 to Lee and 3,205,659 to Hartzell. These prior art applications of accumulators do not, however, provide means by which high pressure fluid flow in a system such as that just described can be substantially continuous without interruption at the end of each stroke.

SUMMARY OF THE INVENTION

It is an object of this invention to provide means by which substantially continuous flow of such high pressure fluid can be obtained. It has now been recognized that low pressure of the high pressure liquid at the beginning of each pumping stroke means a reduced force against which the pistons are moving and therefore a reduced back pressure in the hydraulic system providing power fluid to the pump. It is an object of this invention to provide means for maintaining the power fluid pressure at all times.

According to the present invention pressure accumulator means are connected between the power fluid source and the pump, and means are provided for charging the pressure accumulator with power fluid while it is being supplied to the power end of the pump at the desired pumping pressure and for discharging power fluid from the accumulator into the pump upon reduction of power fluid pressure when the pump piston reverses direction. The accumulator pressure is maintained above the normal power fluid pressure throughout substantially all the discharge period.

In a preferred embodiment of the invention an adjustable proportioning device is utilized to proportion the amount of the power fluid which is supplied to the pump and to the accumulator as required to insure that sufficient power fluid is supplied to the accumulator at a high enough pressure to maintain power fluid pressure when the reciprocating pump piston changes direction.

BRIEF DESCRIPTION OF THE DRAWINGS

FIG. 3 is a fractional vertical sectional view of a portion of the apparatus shown in FIG. 1, taken at line 3—3 of FIG. 1;

FIG. 4 is a vertical sectional view of one embodiment of a dump valve suitable for use in the apparatus of this invention;

FIG. 5 is a vertical sectional view of another embodiment of a dump valve suitable for use in the apparatus of this invention;

DESCRIPTION OF THE PREFERRED EMBODIMENTS

Figure 1:
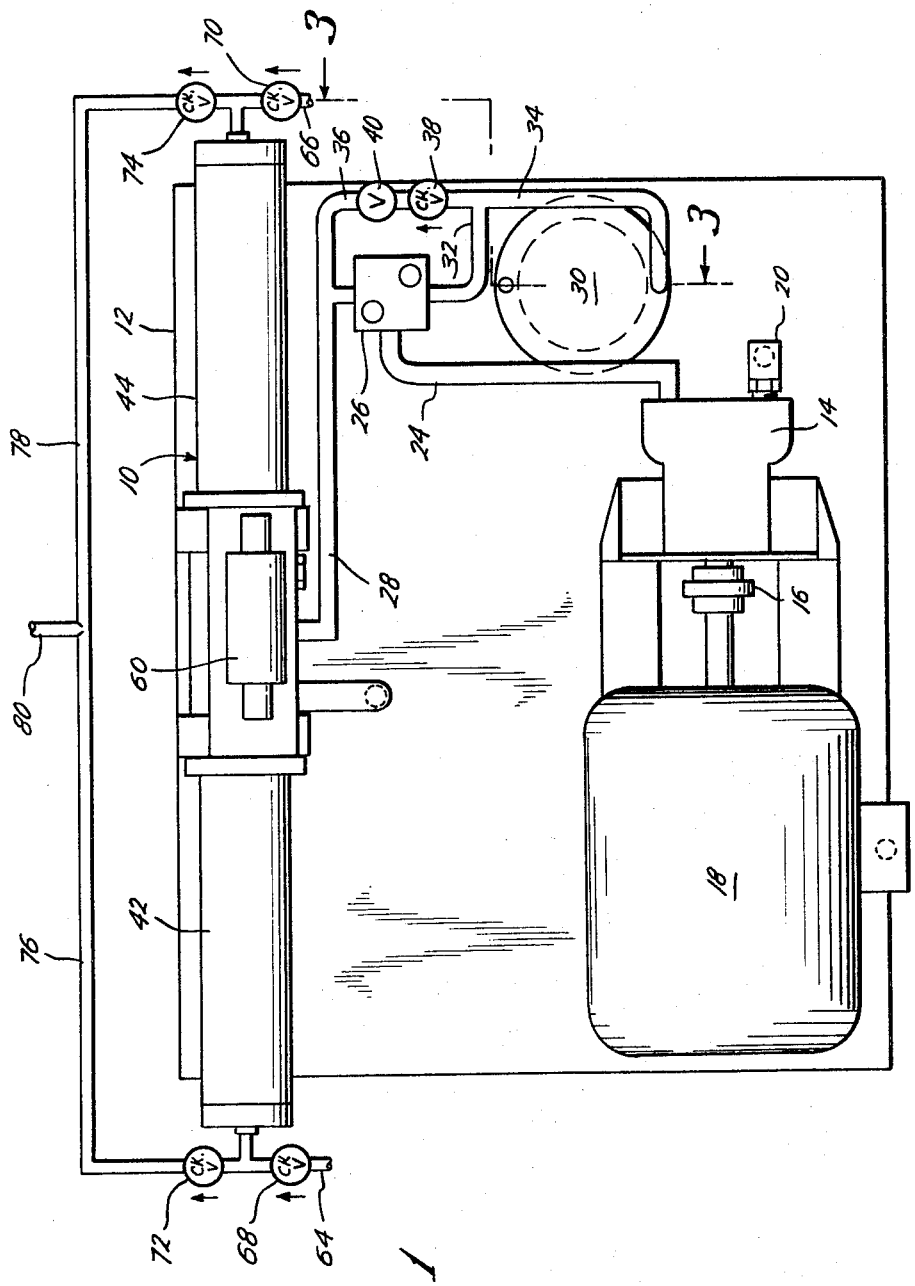
FIG. 1 is a plan view of one embodiment of the apparatus of this invention.

Looking first at FIG. 1 of the drawing, a fluid powered reciprocating pump indicated generally at 10 is shown mounted upon a base 12. Also mounted upon the base 12 is a constant flow pump 14 which may, for example, be a Vickers constant delivery pump which comprises a plurality of sequentially operating pistons which work together to deliver a liquid at a substantially constant and uniform flow rate regardless of the pressure against which the pump is operating. The pump 14 is connected by means of a coupling 16 to an electric motor 18 provided for driving it. Hydraulic fluid utilized for power fluid which is delivered by the constant delivery pump 14 is supplied to the pump 14 by means of conduits 20 which lead from a reservoir which may be carried within the base 12.

Hydraulic fluid is supplied to the reciprocating pump 10 through a pipe 24, a proportioning valve 26 and a pipe 28.

Also shown in the drawing in FIG. 1 is a hydraulic accumulator 30 connected by means of pipes 32 and 34 to the proportioning valve 26, and by means of pipe 36, containing a check valve 38 and a dump valve 40, to the pipe 28 leading to the pump 10.

Figure 2:
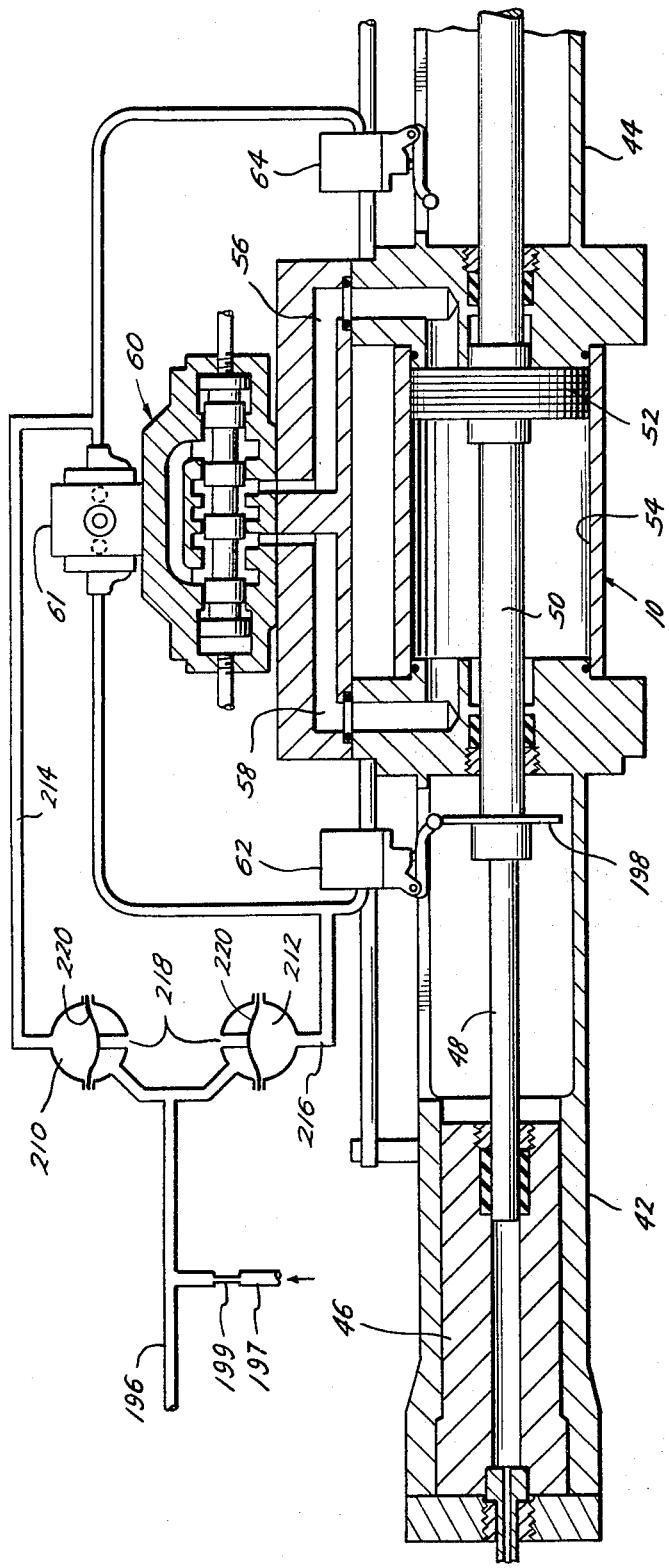
FIG. 2 is a longitudinal sectional view of a pump used in one embodiment of the invention.
Figure 6:
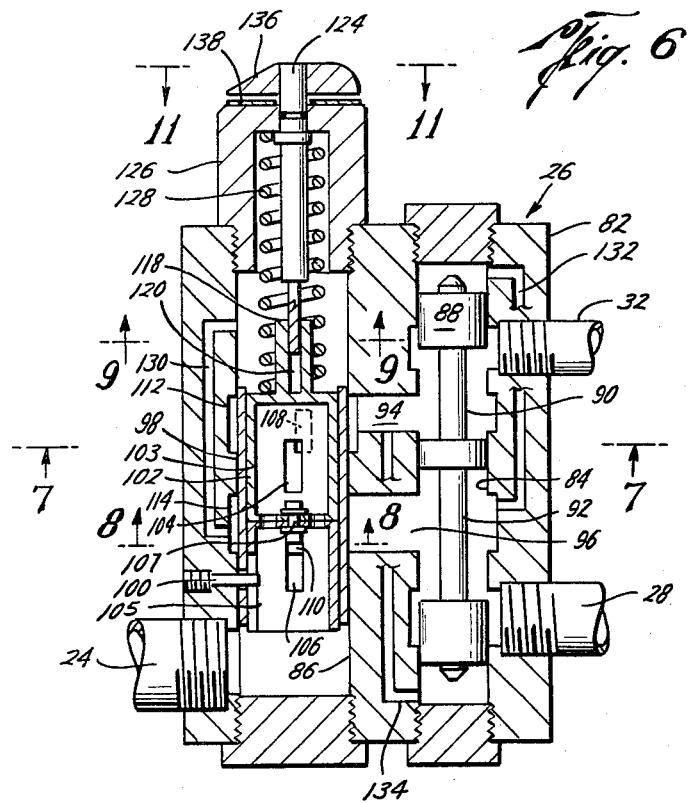
FIG. 6 is a vertical sectional view of one embodiment of a proportioning valve according to this invention.
Figure 9:
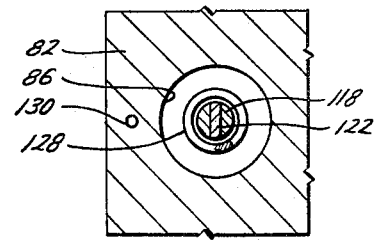
FIG. 9 is another horizontal sectional view of the embodiment shown in FIG. 7, taken at line 9—9 of FIG. 7.
Figure 10:
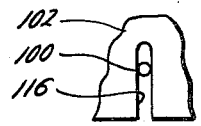
FIG. 10 is a fragmentary view showing a portion of the apparatus shown in FIG. 7.
Figure 7:
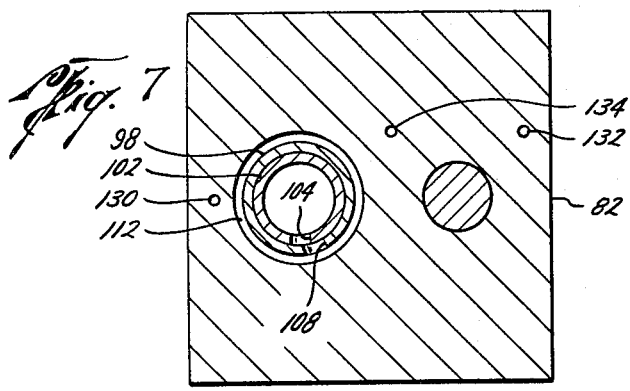
FIG. 7 is a horizontal sectional view of the apparatus of FIG. 7, taken at line 7—7 of FIG. 7.
Figure 11:
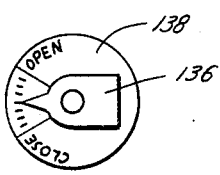
FIG. 11 is a plan view of a portion of the apparatus of FIG. 7, taken at line 11—11 of FIG. 7.
Figure 8:
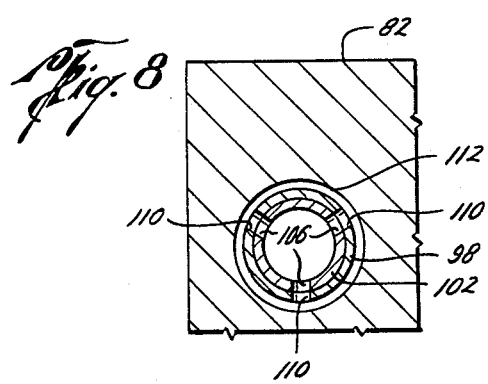
FIG. 8 is another horizontal sectional view of the embodiment of FIG. 7, taken at line 8—8 of FIG. 7.

Reference is now made to FIG. 2 for a more complete description of the pump designated generally at 10 in FIG. 1. The specific construction of this pump is old in the art and constitutes no part of this invention, however some description of the pump is felt to be desirable for a better understanding of the invention.

In the embodiment shown in the drawing this pump is a double acting two cylinder reciprocating pump having a frame member 42 and a corresponding opposite frame member 44. A liner 46 forms a pumping cylinder at one end of the pump and a corresponding liner (not shown) forms a similar pumping cylinder at the other end. The pumping cylinder receives a pumping piston 48 which is attached by conventional means to a piston rod 50 which also carries a power end piston 52. The power end piston reciprocates in a cylinder 54, being driven by power fluid delivered through ports 56 and 58. The power fluid is supplied from the pipe 28 shown in FIG. 1 through a conventional 4-way shuttle valve shown generally at 60. The valve 60 may be operated in a known manner by means of the pilot valve 61 and the limit switches 62 and 64 to cause the power fluid to be directed first to one side and then to the other side of the piston 52.

As shown in FIG. 1, the liquid being pumped is supplied through lines 64 and 66 and check valves 68 and 70, usually from a common source, and the liquid is pumped under high pressure through the check valves 72, 74 and lines 76, 78 to a common discharge line 80.

A portion of the power fluid from the pump 14 is diverted to the hydraulic accumulator 30 by means of the proportioning valve 26. FIGS. 6 to 11 show one embodiment of a proportioning valve which may be used for this purpose. The valve there shown comprises a housing 82 containing two parallel bores 84 and 86. Bore 84 contains a shuttle valve 88 which is reduced in diameter at two longitudinally displaced locations 90 and 92 to provide a fluid passageway across the bore 84 from ports 94 and 96 to pipes 32 and 28, respectively.

Bore 86 contains a sleeve member 98 which extends from above the upper edge of port 94 to below the lower edge of port 96 and which is held in place by a dog 100. Telescopically received within the sleeve 98 is a hollow cylindrical slidable valve member 102. Valve member 102 consists of an upper rotatable element 103, and a lower non-rotatable element 105, connected loosely together, as by a connector 107, so that they can rotate relative to one another. Member 103 is closed at the upper end and is provided with a port 104 in its cylindrical wall, positioned adjacent a corresponding port 108 in the sleeve 98.

The connection between member 103 and 105 allows flow from the interior of 105 to the interior of 103, but the ends of 103 and 105 are close enough together that there is substantially no leakage between them. If desired a rotatable seal may be used here. The lower member 105 has a plurality of ports 106 in its cylindrical wall, three being shown, which are aligned circumferentially opposite corresponding ports 110. The dog 100 extends into a slot 116 in the wall of member 105 to prevent it from rotating with respect to the sleeve 98, and thereby maintain the alignment of the ports 106 and 110. Valve member 102 is preferably a close sliding fit in sleeve 98, but need not be a fluid-tight fit.

The bore 86 is enlarged in diameter at 112 and 114 to provide a fluid passageway from the inside of the sliding valve member 102, through the aligned ports, and to the ports 94 and 96. It will be appreciated that as the sliding valve member 102 moves upwardly the sizes of the openings provided by by ports 104, 108 and 106, 110, for fluid flow therethrough are increased proportionally. The ratio between the flow through the upper ports and that through the lower ports depends upon the relative azimuthal position of upper and lower members 103 and 105.

The valve member 102 is provided with a stem 118 which is slotted at 120 to receive a flat bar 122 attached to a rotatable shaft 124 which is sealingly received within a cover member 126 which covers the upper end of the bore 86. A spring 128 bears upwardly against the cover member 126 and resiliently biases the sliding valve member 102 downwardly.

A pointer 136 mounted on the upper end of shaft 124 is provided to indicate, on a dial 138 mounted on the top of the cover member 126, the relative positions of the ports 104 and 108. Rotation of this pointer causes rotation of the member 103, and thereby changes the sizes of the passageway provided by these ports, and thus the proportion of flow through this passageway as compared to through the passageway provided by ports 106 and 110.

A fluid passageway 130 is provided between the enlargement 114 around the bore 86 and the space in the bore 86 above the sliding valve member 102 so as to allow liquid to be exhausted from this upper portion of the bore when the sliding valve member is moved upwardly, and to equalize the pressure in the port 96 and the upper end of bore 86.

Similar bypasses 132 and 134 are provided between the ends of bore 84 and the ports 94 and 96 as shown in the drawing.

In FIG. 3 there is shown additional detail of the accumulator 30 and the piping and valving associated therewith. As there shown, the conduit 34 leading from conduit 32 connected to the proportioning valve is in communication with the lower end of the accumulator housing 140. In the embodiment shown in the drawing the housing 140 comprises a bell shaped cylindrical vessel closed at its lower end by a cover member 142 sealingly received therein. A piston 144 is carried within the accumulator and sealingly engages the interior wall thereof, sealing being accomplished by O-rings 146 and 148. Means are provided for charging the housing with air or other gas under pressure through a conduit 150 which opens into the accumulator above the O-ring 146, when the piston is at the bottom as shown.

The check valve 38 and dump valve 40 are connected between the conduit 34 and the conduit 36 which leads to pump 10, a conduit 151 providing communication between the two valves. A conduit 152 branches off from the conduit 34 and leads to a check valve 154, and a conduit 153 is connected between check valve 154 and the bottom of the dump valve 40 to provide actuating pressure therefor, as will hereinafter be described. A bypass line 156 is provided with a choke or restriction 158 therein in parallel with the check valve 154.

The embodiment of the dump valve shown in FIG. 3 is shown in greater detail in FIG. 4. As there seen the dump valve comprises a body member 160, having a screwed on cover 162. The body member has ports 164 and 166 into which conduits 36 and 151 are connected. As already shown in FIG. 3 conduit 153 leads into the bottom of the body member 160. The body member is provided with a vertical bore 168 therein containing a shuttle valve member 170 having a reduced diameter portion 172 to provide a fluid passageway between the ports 166 and 164 when the shuttle valve is positioned so that the reduced diameter portion overlaps the ports. As shown in the drawing the shuttle valve is in closed position. A spring 174 acts to bias the shuttle valve toward closed position. The compression of the spring is adjustable by means of a cap screw 176 which bears against a spring washer 178. A fluid passageway 180 provides communication between the downstream port 164 and the upper portion of bore 168 which, together with the bore of the cover member 162, provides a spring chamber. Thus the fluid pressure in the spring chamber is maintained equal to the pressure in port 164, and therefore at the pressure of the liquid being supplied to the pump 10. In addition to its obvious function of providing an exhaust for liquid within the spring chamber when the shuttle valve 170 moves upwardly, this pressure equalization functions in the automatic operating of the dump valve, as will later be explained.

In the operation of the embodiment of the apparatus which has just been described, power fluid is supplied at a uniform flow rate by the constant delivery pump 14 through the line 24 to the proportioning device 26. In the proportioning device the power fluid passes through the bore 86 and the bore of the valve member 102. The flow is divided between the aligned ports 106, 110, and the ports 104, 108, so that a portion of the power fluid flows through passageway 94 and another portion flows through passageway 96. Pointer 136 has already been set so as to adjust the proportion of flow between ports 94 and 96 as desired. The power fluid then passes across the bore 84 and into conduits 32 and 28 respectively.

It will be appreciated that if at any one setting of the pointer 136 the ratio of the flows through ports 94 and 96 is to be maintained, it is necessary that the pressure in these ports be equal. Equalization of pressure cannot be accomplished by communication between the ports since this would change the flow through the ports. According to this invention, pressure equalization is achieved by restrictions downstream of ports 94 and 96. Thus passageways 132 and 134 are provided, passageway 132 communicating the pressure of port 96 to the upper end of the shuttle valve 88 and passageway 134 communicating the pressure of port 94 to the lower end of the shuttle valve 88. Thus if the pressure in port 96, for example, were to become greater than the pressure in port 94 the shuttle valve 88 would be moved downwardly and restrict the flow into conduit 32 while at the same time increasing the flow opening into conduit 28. This will, of course, decrease the back pressure on port 96 and increase the back pressure on port 94 until they are equalized.

It is apparent that the pressure in the bore 86 is greater than the pressure in ports 94 and 96, due to the throttling effect of the ports 104, 108 and 106, 110 in the valve member 102. Thus the pressure above valve member 102 is less than the pressure below it, so that the valve member 102 will tend to move upwardly against the compression of the spring 128. As the pressure differential increases the upward movement of the valve member is greater so that the ports are opened more. The greater opening of the ports decreases the pressure differential until the upward force due to pressure differential is balanced by the spring, so that the valve member will soon reach an equilibrium position. In other words, liquid being supplied at a constant rate of flow moves the sleeve upwardly until the ports are opened enough to allow this flow rate through the ports. The distance the sleeve moves is a function of spring pressure and back pressure on the upper end of the sleeve, delivered through passage 130. Thus if the pressure in port 96 goes up, this reduces the pressure differential across the sleeve, so that the sleeve must move upwardly more to open the ports enough to achieve the same flow rate at the reduced pressure differential. Of course, on such vertical movement of the valve member the proportion of flow between the ports 94 and 96 is maintained the same. The passageway 130 provides a fluid relief channel for the spring chamber to allow the valve member to move upwardly.

As in seen in FIG. 1, the liquid from conduit 28 leaving the proportioning device goes to power the pump 10 while the liquid from the proportioning device through conduit 32 goes through conduit 34 to charge the accumulator 30. According to this invention the accumulator is precharged to a pressure near or greater than the desired working pressure of the power fluid being supplied to the pump 10.

Then upon starting the constant flow pump 14 so that fluid flows from the proportioning valve to the accumulator, power fluid will flow in under the piston 144 to charge the accumulator with power fluid. The piston is thereby moved upwardly to compress the gas above it to a still higher pressure. In one example, where a 600 p.s.i. pump operating pressure was desired, it was found to be desirable to pressurize the accumulator to a pressure of 700 p.s.i. This may be accomplished at the same time that the constant output pump is providing liquid at 600 p.s.i. to the pump 10 because the proportioning valve insures that the proportion of liquid flowing to the accumulator and to the pump 10 is maintained the same regardless of the pressures against which they operate. When the pressure going to the accumulator becomes greater than the pressure going to the pump 10, the shuttle valve 88 in the proportioning valve is moved upwardly to throttle the flow into the pump through line 28 and to reduce the throttling of the flow into the accumulator through line 32. This means that the pressures in ports 94 and 96 in the proportioning valve are both increased somewhat. This reduces the pressure differential across the valve member 102, thereby causing it to be moved downwardly so that more pressure drop can increase the back pressure on the constant delivery pump feeding the power fluid into the proportioning valve.

Thus the net effect of the increasing pressure in the accumulator is to increase the pressure of the fluid being fed into the proportioning valve while maintaining the desired flow proportions through the accumulator and to the pump 10.

In an installation in which the pump 10 must pump against a back pressure of 30,000 p.s.i. and the effective area of piston 52 is 50 times the area of piston 48, the power fluid supplied to the pump 10 must have a pressure of 600 p.s.i. in order to force fluid through the check valves 72, 74 against the 30,000 p.s.i. back pressure. On the return stroke of the piston 48, however, it is drawing liquid into the cylinder, and into the space between the check valves 68 and 72 at a substantially lower pressure. Thus when the piston 48 again begins its pumping stroke it must first build up the pressure in the cylinder 46 and in the piping between the check valves 68 and 72 to 30,000 p.s.i. before it can force any more liquid through the check valve 72 against the 30,000 p.s.i. back pressure. Since all liquids are to some extent compressible, and since the cylinder 46 and the piping between the check valves will expand upon the application of pressure, the piston 48 will move a substantial distance before a 30,000 p.s.i. pressure is reached, so that in this portion of the stroke no liquid is pumped through the check valve 72. During this portion of the stroke therefore the power fluid being fed to the pump 10 is also at a lower pressure than the 600 p.s.i. required for a 30,000 p.s.i. pumped fluid pressure. This means that the pressure in conduit 28 leading to the pump 10, and in conduit 36 connected thereto, is also less than 600 p.s.i. Thus this reduced pressure is also present in the spring chamber in the dump valve 40 shown in FIG. 4.

At this point in the cycle the accumulator 30 has been fully charged with power fluid, and the gas therein compressed to a pressure substantially above the 600 p.s.i. normal operating pressure. This pressure is applied to the bottom of the shuttle valve 170 in dump valve 40 through conduit 153 connected thereto. The reduction of pressure in the spring chamber above the shuttle valve 170 is sufficient that this accumulator pressure can overcome the spring 174 and move the shuttle valve 170 upwardly, thereby opening communication between conduit 151 and conduit 36 and allowing the accumulator to discharge through these conduits into conduit 28 and thence into the cylinder 54 of pump 10. The accumulator volume and the precharge pressure therein are such that the power fluid from the accumulator remains at a pressure above normal power fluid pressure throughout the period during which, at the beginning of its stroke, piston 48 is building up a 30,000 p.s.i. pressure. This discharge of the fluid from the accumulator occurs very quickly, speeding up the movement of the piston 52, so that the pressure in the cylinder 54 of pump 10 is almost immediately brought back up to the desired operating pressure. Thus the pressure in port 164 is very quickly brought to the pressure of conduits 152 and 156. The spring 174 therefore tends to overcome the pressure in line 153 which is holding the shuttle valve 170 in open position and fluid pressure begins to leak off through the choke 158 thereby allowing the shuttle valve to close slowly. When the shuttle valve is fully closed, flow of power fluid from the accumulator is shut off, and the pump 10 is supplied with power fluid only through the conduit 24 and the proportioning device 26 directly into conduit 28 leading to the pump. At the same time flow from the proportioning device starts recharging the accumulator.

It is apparent that the pointer 136 must be adjusted so that the proportioning device will deliver adequate power fluid to the accumulator to allow it to provide power fluid to the pump 10 during the pressurizing portion of its cycle.

In addition, the cap screw 176 on the dump valve 40 must be adjusted so that the force of the spring 174 is high enough to overcome the normal pressure differential between the accumulator and the line 36, but is insufficient to overcome the differential which exists at the beginning of each stroke of the pump 10.

It will be appreciated that the dump valve 40 shown in FIG. 4 operates automatically upon a reduction of pressure in the line 36. In FIG. 5 there is shown a modification of the dump valve which operates in response to the signal which causes the shuttle valve 60 on pump 10 to operate. In practice, this dump valve may work better than the FIG. 4 dump valve at higher pressures. In this embodiment the body 160' has fastened thereto, as by means of screw threads, a bonnet 182 which is provided with a cover member 184. A piston 186 is carried within the bonnet and is attached to the stem 188 of a slidable shuttle valve 170' which reciprocates within a bore 168' in the body member. A compression spring 174' is carried between the upper end of the body member and the bottom of the piston 186 and resiliently biases the piston upwardly. A vent 190 is provided in the bonnet to vent the spring chamber therein. A vent 192 extends longitudinally through the shuttle valve to provide communication between the spring chamber and the portion of bore 168' below the shuttle valve. A drain line 194 is connected into the lower end of this bore.

Air pressure is provided to the space above the piston 186 by means of a conduit 196 which is connected to an air supply line 197 as shown in FIG. 2. As shown, air supply line 197 is provided with a choke 199. Conduit 196 leads to a pair of diaphragm valves 210 and 212, valve 210 being connected by a conduit 214 to the pilot air conduit for limit switch 64 and valve 212 being connected by a conduit 216 to the pilot air conduit for limit switch 62. Each of the diaphragm valves is provided with an exhaust 218 positioned to be closed by the diaphragm 220 when pilot air is under pressure. The space under the diaphragm is connected to conduit 196. When a flange 198 hits the limit switch 62 (or a corresponding flange on the other side hits the limit switch 64) a signal is provided to the pilot valve 61 to exhaust air pressure from one end of the shuttle valve 60 and thereby move the shuttle valve to direct power fluid to the opposite end of the cylinder 54. This same signal is provided through line 214 or 216 to momentarily exhaust the space above one of the diaphragms 220. The pressure in line 196 forces the diaphragm to open the exhaust 218 and the air releases from conduit 196, so as to exhaust the space above the piston 186, causing the spring 174' to move the shuttle valve 170' upwardly and thereby open communication between ports 166' and 164'. Fluid may then flow from the accumulator through line 151, the dump valve, line 36, and line 28 to the pump 10 in the same manner as when the dump valve of FIG. 4 is used.

As soon as flange 198 releases the limit switch 62, pilot air pressure is restored and the diaphragm is moved back to cover the exhaust 218. The dump valve is repressured, and therefore slowly closed, by air flowing from the air supply line 197 through the choke 199, the choke size determining the time required for closing the dump valve.

Figure 12:
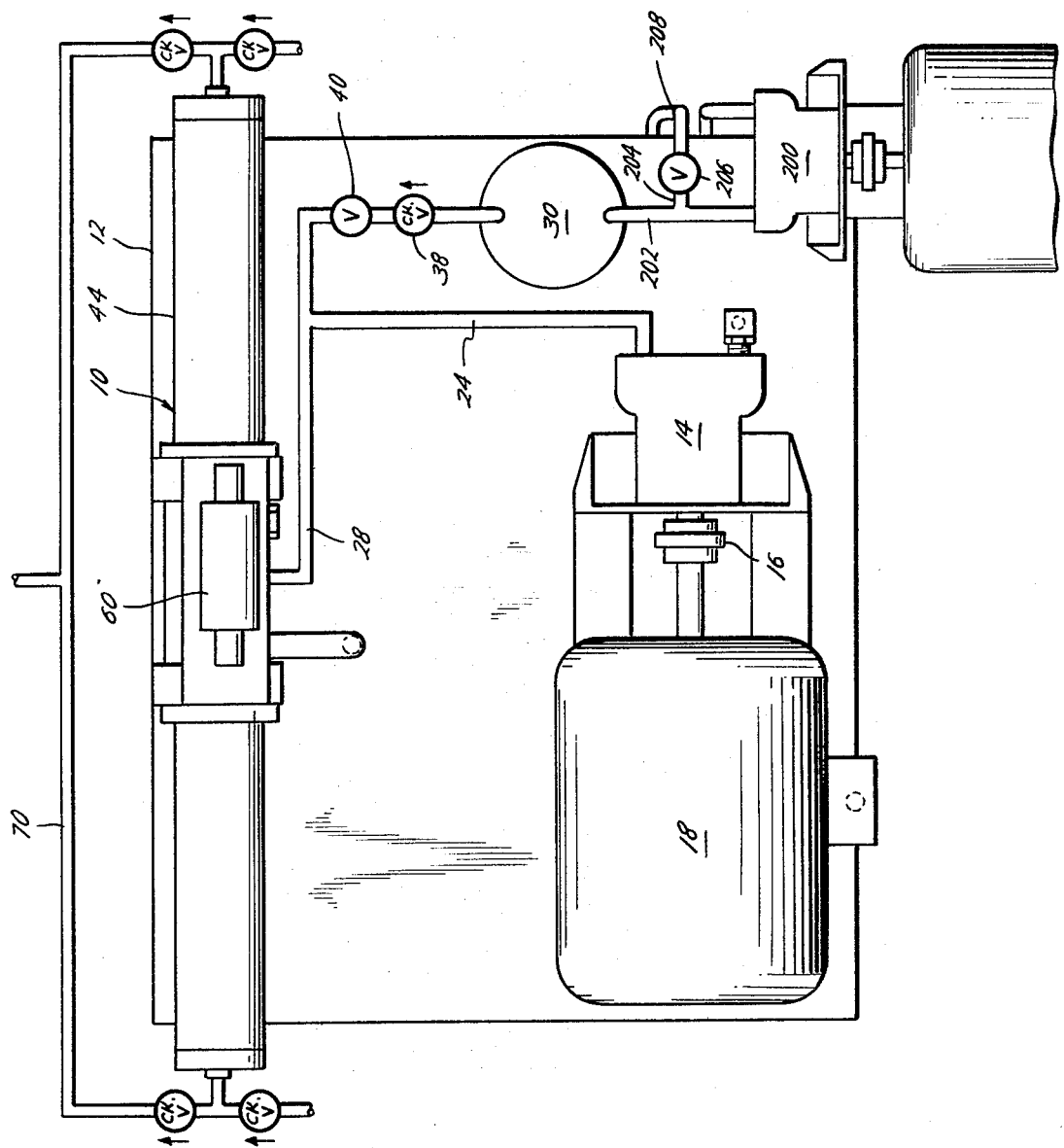
FIG. 12 is a plan view of another embodiment of this invention.

In FIG. 12 there is shown a modification of the invention in which the use of a proportioning device, such as the proportioning device 26 hereinbefore described, is dispensed with. Here a pump 200 is used to provide power fluid to pressurize the accumulator 30. Such power fluid is provided through a fluid conduit 202. A recirculating line 204 connected into the conduit 202 contains a pressure relief valve 206 which opens when the accumulator has been charged to a predetermined pressure. At this point the pressure relief valve 206 opens and allows additional fluid from pump 200 to return to the reservoir through the line 208. Alternatively, the output volume of the pump 200 can be controlled as necessary to just supply the accumulator.

The accumulator, check valves and dump valve shown in FIG. 3 may suitably be used in this embodiment of the invention, the only difference being that fluid from the pump 14 is not used to charge the accumulator.

Although various embodiments of the invention have been shown and described herein, the invention is not limited to the specific embodiments thus disclosed but includes such variations and modifications thereof as will be apparent to those skilled in the art and which may be included within the language of the appended claims.

I claim:
1. Apparatus comprising
   a source of power fluid at a comparatively low pressure,
   a fluid powered reciprocating pump connected to be driven by said power fluid,
   a pressure accumulator connected for discharging to the power end of said pump,
   said accumulator being charged to the extent necessary to remain at a pressure no less than said comparatively low pressure in its discharged state, and
   valve means intermediate said accumulator and said pump operable in response to a reduction in pressure in the power end of the pump to open communication between the accumulator and the power end of the pump.
2. Apparatus as defined by claim 1 and including a second pump connected to said accumulator to supply power fluid thereto.
3. Apparatus as defined by claim 1 and including proportioning means intermediate said power fluid source and said pump for diverting a portion of the power fluid to the accumulator while still providing power fluid to said pump.

4. Apparatus as defined by claim 3 wherein said proportioning means comprises a back pressure compensating device operable in response to a change in the ratio of the pressures in the power end of the pump and in the accumulator to maintain a desired proportion between the flow rates to the power end of the pump and to the accumulator.

5. Apparatus as defined by claim 3 wherein said proportioning means comprises
a pair of ports, one for fluid to the pump and one for fluid to the accumulator, one of said ports being selectively adjustable in size to change the proportion of flow through said ports.

6. Apparatus as defined by claim 5 wherein said ports are selectively adjustable in size without a change in proportion.

7. Apparatus comprising
a liquid powered reciprocating pump,
means for supplying power liquid to the power end of said pump at a first pressure and at a substantially constant flow rate, and
supplementary power fluid means connected for communication with the power end of said pump adapted to supply liquid to said power end when the pressure in the power end is reduced to a pressure lower than said first pressure.

8. Apparatus as defined by claim 7 and including valve means intermediate said supplementary power fluid means and the power end of said pump operable to allow communication between said supplementary power fluid means and the power end of said pump in response to a reduction of the pressure in the power end to below said first pressure, and operable to prevent such communication in response to an increase in the power end pressure to said first pressure.

9. A system for producing high pressure liquid at substantially constant volume and pressure, comprising
a source of power liquid at a comparatively low pressure,
a liquid powered reciprocating pump having a relatively large power piston and a relatively small pumping piston mounted on the same rod,
piping means for conveying power liquid from said source to the power end of said reciprocating pump,
a pressure accumulator comprising a gas-containing vessel having an opening for receiving and discharging power liquid, and
proportioning means connected between said source and said reciprocating pump adapted to proportion the flow of power liquid between said reciprocating pump and said accumulator.

10. A system as defined by claim 9 wherein said proportioning means comprises
means for maintaining a predetermined proportion between the rates of flow to the pump and to the accumulator while the accumulator is being charged with power liquid,
said accumulator being such that its pressure increases as it is being charged.

11. Apparatus as defined by claim 9 and including valve means intermediate said accumulator and said pump operable in response to a reduction in pressure in the power end of the pump to open communication between the accumulator and the power end of the pump.

12. In apparatus for supplying liquid to a high pressure system at a substantially constant rate of flow, comprising a multi-cylinder reciprocating high pressure pump comprising a comparatively large power piston connected to drive at least one comparatively small pumping piston,
said pumping piston being reciprocatingly received in a cylinder in communication with said system and with a source for said liquid, and
constant flow rate power fluid supply means connected to supply power fluid to said pump at a pressure sufficient to drive said power piston to cause said pumping piston to pump into said high pressure system,
the improvement which comprises means separate from said power fluid supply means connected to supply power fluid to said pump to drive said power piston when the pressure of the power fluid supplied by said power fluid supply means drops below that necessary to cause said pumping piston to pump into said high pressure system.

13. Apparatus as defined by claim 12 wherein said improvement comprises
a pressure accumulator charged to a pressure sufficiently high that its pressure when discharged is not substantially less than the pressure necessary to cause said pumping piston to pump into said high pressure system.

14. Apparatus as defined by claim 13 and including another pump connected to said accumulator to charge it.

15. Apparatus as defined by claim 13 and including proportioning means intermediate said power fluid supply means and said pump, and connected to said accumulator, adapted to divert a portion of the power fluid to the accumulator while the pump is being supplied.

16. Apparatus as defined by claim 13 and including valve means intermediate said accumulator and said pump operable, in response to a reduction in pressure below that sufficient to cause the pumping piston to pump into the high pressure system, to open communication between the accumulator and the power end of the pump.

17. Apparatus as defined by claim 16 and including proportioning means intermediate said power fluid supply means and said pump, and
conduit means connecting said proportioning means and said accumulator,
said proportioning means comprising means for diverting a portion of the power fluid to the accumulator while still providing power fluid to the pump, and including
a back pressure compensating device operable in response to a change in the ratio of the pressures of the power fluid being supplied to the pump and that being supplied to the accumulator to maintain a desired proportion between the flow rates to the pump and to the accumulator.

References Cited
UNITED STATES PATENTS

| 1,995,815 | 3/1935 | Purdum | 417—390 |
| 2,170,890 | 8/1939 | Allen | 60—51 X |
| 2,595,248 | 5/1952 | Greer et al. | 60—51 |
| 2,780,065 | 2/1957 | Spannhake | 60—51 X |

ROBERT M. WALKER, Primary Examiner

U.S. Cl. X.R.

60—51